2 Sheets--Sheet 1.

S. A. TODD.

Nut Fastenings.

No. 133,812.                        Patented Dec. 10, 1872.

Attest;
Edw. W. Donn
Jno. D. Patten

Inventor;
Samuel A. Todd.
By J. J. Johnston & Bro.
his attorneys

2 Sheets--Sheet 2.
S. A. TODD.
Nut Fastenings.
No. 133,812.  Patented Dec. 10, 1872.
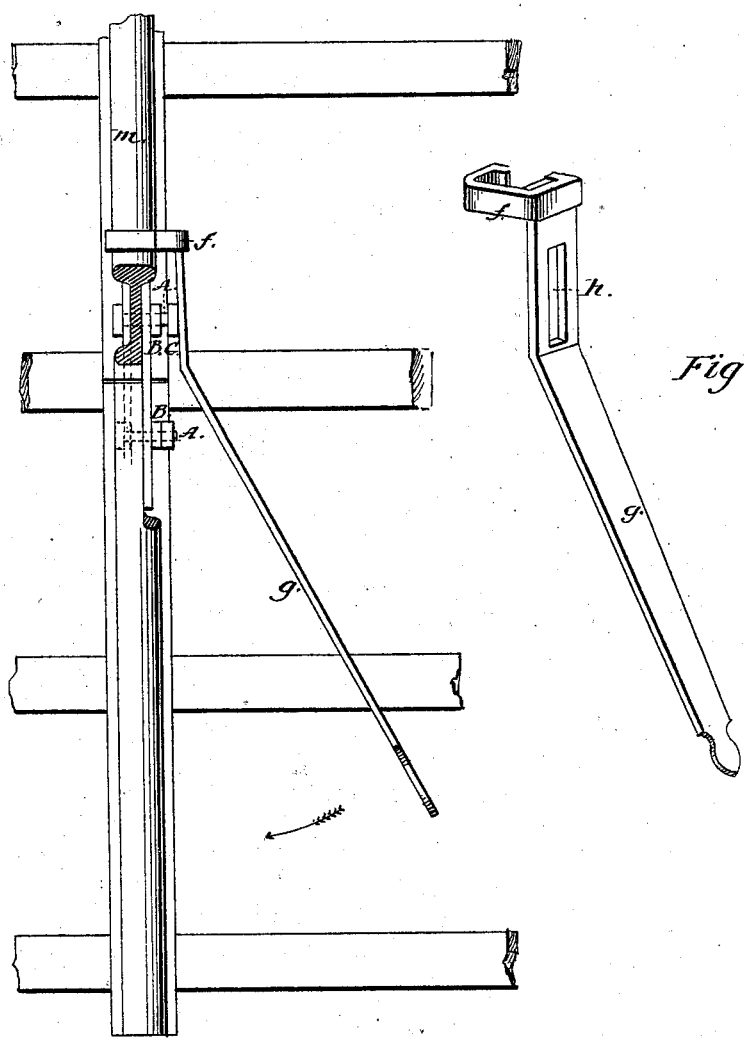
Attest:
Edy. W. Donn
Jno. D. Patten
Inventor:
Samuel A. Todd.
By J. J. Johnston & Bro.
his attorneys.

UNITED STATES PATENT OFFICE.

SAMUEL A. TODD, OF WELLSVILLE, OHIO, ASSIGNOR TO EDWARD A. KITZ-MILLER, OF PITTSBURG, PENNSYLVANIA, AND JAMES H. PLATT, JR., OF PETERSBURG, VIRGINIA, TRUSTEES.

IMPROVEMENT IN NUT-FASTENINGS.

Specification forming part of Letters Patent No. 133,812, dated December 10, 1872.

*To all whom it may concern:*

Be it known that I, SAMUEL A. TODD, of Wellsville, in the county of Columbiana and State of Ohio, have invented a certain new and useful Improvement in Lock-Nut and mode of applying the same; and I do hereby declare that the following is a full, clear, and exact description thereof, reference being had to the accompanying drawing and to the letters of reference marked thereon.

The nature of my invention consists in a gum or elastic nut, the opening for the screw-bolt of which is of less diameter than the diameter of the screw-bolt upon which said gum or elastic nut is placed; said nut not being forced to its position on the screw-bolt in the manner and by the means herein described.

To enable others skilled in the art to make and use my invention, I will proceed to describe more fully its construction and operation.

Figure 1:
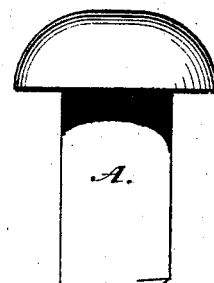
Figure 2:
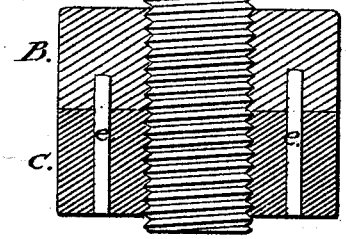

In the accompanying drawing which forms part of my specification, Figure 1 is a side view of an ordinary bolt and transverse sections of the ordinary screw-nut and gum nut. Fig. 2 is an end view of the gum nut and a section of a screw-bolt, representing the opening in the nut of less diameter than the diameter of the bolt. Fig. 3 represents a top view of a section of two rails for railways, connected by means of "fish-bars" and bolts, and also represents the mode of applying the lever used for forcing the gum nut upon the screw-bolt. Fig. 4 is a perspective view of the lever used for forcing the gum nut upon the screw-bolt.

In the accompanying drawing, A represents a screw-bolt, and B its nut, both of which are of ordinary construction. C represents a gum nut, the opening of which is of less diameter than the diameter of the bolt A upon which it is placed, so that it will contract, filling the spaces between the screw-threads of the bolt A, as clearly shown in Fig. 1. The gum nut C is provided with two iron pins, e, which enter openings made in the iron screw-nut B, whereby the gum nut C is held in a fixed position with relation to the iron nut B, which will be prevented from turning by the impinging of the gum nut upon the bolt A and its screw-threads.

I do not, however, confine my invention to the use of the pins e in connection with the nuts B and C; nor do I confine my invention to the form of gum nut shown in the accompanying drawing, for the form may be varied to suit the taste and judgment of the user.

From the foregoing description it will be observed that the essential feature of my invention consists in the use of a gum nut, the opening for the bolt being less in diameter than the diameter of the bolt upon which it is to be placed, and in forcing the gum nut upon the bolt by means of a lever, or its equivalent, whereby the gum nut is placed upon the bolt with great facility, and so impinges upon the bolt that it serves the purpose of a jam-nut, preventing the nut B from becoming unscrewed by any undue jarring action it or its bolt may be subjected to.

m represents sections of two rails for railways secured together by means of "fish-bars" and bolts. The hook f of the lever g, shown in Fig. 4, is hooked on the rail, as shown in Fig. 3, and the gum nut placed with its opening opposite the point of the bolt A, and in line with the slot h of lever g, so that the point of the bolt will enter the slot h; now, by forcing the lever sidewise, as indicated by the arrow n, the gum nut C will be forced upon the bolt A and against the nut B.

Having thus described the nature and construction of my improvement, what I claim as of my invention is—

1. A gum nut provided with an opening for a screw-bolt, said opening being of less diameter than the diameter of screw-bolt upon which the nut is to be placed, substantially as hereinbefore described, and for the purpose set forth.

2. A lever, substantially as hereinbefore described, for forcing the gum nut to its place upon the bolt, as and for the purpose set forth.

SAMUEL A. TODD.

Witnesses:
WILLIAM BLEAKLY,
SAMUEL POLLOCK.